US012272370B2

(12) United States Patent
Avendano et al.

(10) Patent No.: US 12,272,370 B2
(45) Date of Patent: Apr. 8, 2025

(54) AUDIO SOURCE SEPARATION FOR AUDIO DEVICES

(71) Applicant: Apple Inc., Cupertino, CA (US)

(72) Inventors: Carlos M. Avendano, Campbell, CA (US); John Woodruff, Santa Cruz, CA (US); Jonathan Huang, Pleasanton, CA (US); Mehrez Souden, Los Angeles, CA (US); Andreas Koutrouvelis, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/376,438

(22) Filed: Oct. 3, 2023

(65) Prior Publication Data

US 2024/0029754 A1 Jan. 25, 2024

Related U.S. Application Data

(63) Continuation of application No. 17/589,889, filed on Jan. 31, 2022, now Pat. No. 11,810,588.

(60) Provisional application No. 63/151,621, filed on Feb. 19, 2021.

(51) Int. Cl.
*H04R 29/00* (2006.01)
*G06N 20/00* (2019.01)
*G10L 21/0232* (2013.01)
*G10L 21/028* (2013.01)
*H04R 1/10* (2006.01)

(52) U.S. Cl.
CPC .......... *G10L 21/028* (2013.01); *G06N 20/00* (2019.01); *G10L 21/0232* (2013.01); *H04R 1/1016* (2013.01); *H04R 1/1041* (2013.01); *H04R 1/1083* (2013.01); *H04R 2420/07* (2013.01)

(58) Field of Classification Search
CPC . G10L 21/028; G10L 21/0232; H04R 1/1016; H04R 1/1041; G06N 20/00
See application file for complete search history.

(56) References Cited

U.S. PATENT DOCUMENTS 9,754,190 B1 9/2017 Guttmann
10,178,490 B1 1/2019 Sheaffer
11,545,134 B1 1/2023 Federico
(Continued)

OTHER PUBLICATIONS

Ahmad, et al., "Multimodal Speaker Diarization Using a Pre-Trained Audio-Visual Synchronization Model," retrieved from https://www.ncbi.nlm.nih.gov/pmc/articles/PMC6929047/pdf/sensors-19-05163.pdf, Nov. 2019, 14 pages.

*Primary Examiner* — Simon King
(74) *Attorney, Agent, or Firm* — BAKERHOSTETLER

(57) ABSTRACT

Implementations of the subject technology provide systems and methods for providing audio source separation for audio input, such as for audio devices having limited power and/or computing resources. The subject technology may allow an audio device to leverage processing and/or power resources of a companion device that is communicatively coupled to the audio device. The companion device may identify a noise condition of the audio device, select a source separation model based on the noise condition, and provide the source separation model to the audio device. In this way, the audio device can provide audio source separation functionality using a relatively small footprint source separation model that is specific to the noise condition in which the audio device is operated.

20 Claims, 7 Drawing Sheets

(56) References Cited

U.S. PATENT DOCUMENTS

| | | |
|---|---|---|
| 2017/0154273 A1 | 6/2017 | Guttmann |
| 2018/0150695 A1 | 5/2018 | Guttmann |
| 2018/0150698 A1 | 5/2018 | Guttmann |
| 2019/0027147 A1* | 1/2019 | Diamant ................ G10L 15/22 |
| 2020/0167569 A1* | 5/2020 | Simpkinson ........ G06F 18/2415 |
| 2020/0380301 A1 | 12/2020 | Siracusa |
| 2021/0213909 A1 | 7/2021 | Petersoon |
| 2021/0217182 A1 | 7/2021 | Li |
| 2022/0028406 A1* | 1/2022 | Burmistrov ............. G06F 18/21 |
| 2022/0148571 A1 | 5/2022 | Wang |
| 2022/0159403 A1 | 5/2022 | Sporer |

\* cited by examiner

AUDIO SOURCE SEPARATION FOR AUDIO DEVICES

CROSS REFERENCE TO RELATED APPLICATIONS

This application is a continuation of U.S. patent application Ser. No. 17/589,889, entitled "AUDIO SOURCE SEPARATION FOR AUDIO DEVICES," filed on Jan. 31, 2022, which claims the benefit of priority to U.S. Provisional Application No. 63/151,621, entitled "AUDIO SOURCE SEPARATION FOR AUDIO DEVICES," filed on Feb. 19, 2021, the disclosure of each of which is hereby incorporated herein in its entirety.

TECHNICAL FIELD

The present description relates generally to media output devices and, more particularly, for example, to operations for audio source separation for audio devices such as limited resource audio devices.

BACKGROUND

Audio devices such as headphones and earbuds can include noise-cancelling features in which sounds generated externally to the audio device are detected and cancelled by the audio device. In this way, a wearer of the audio device can be provided with a reduced-noise environment and/or an enhanced listening environment for audio content generated by the audio device. However, it can be challenging to provide noise-cancelling features in varying environments using audio devices that may have limited processing and/or power resources.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
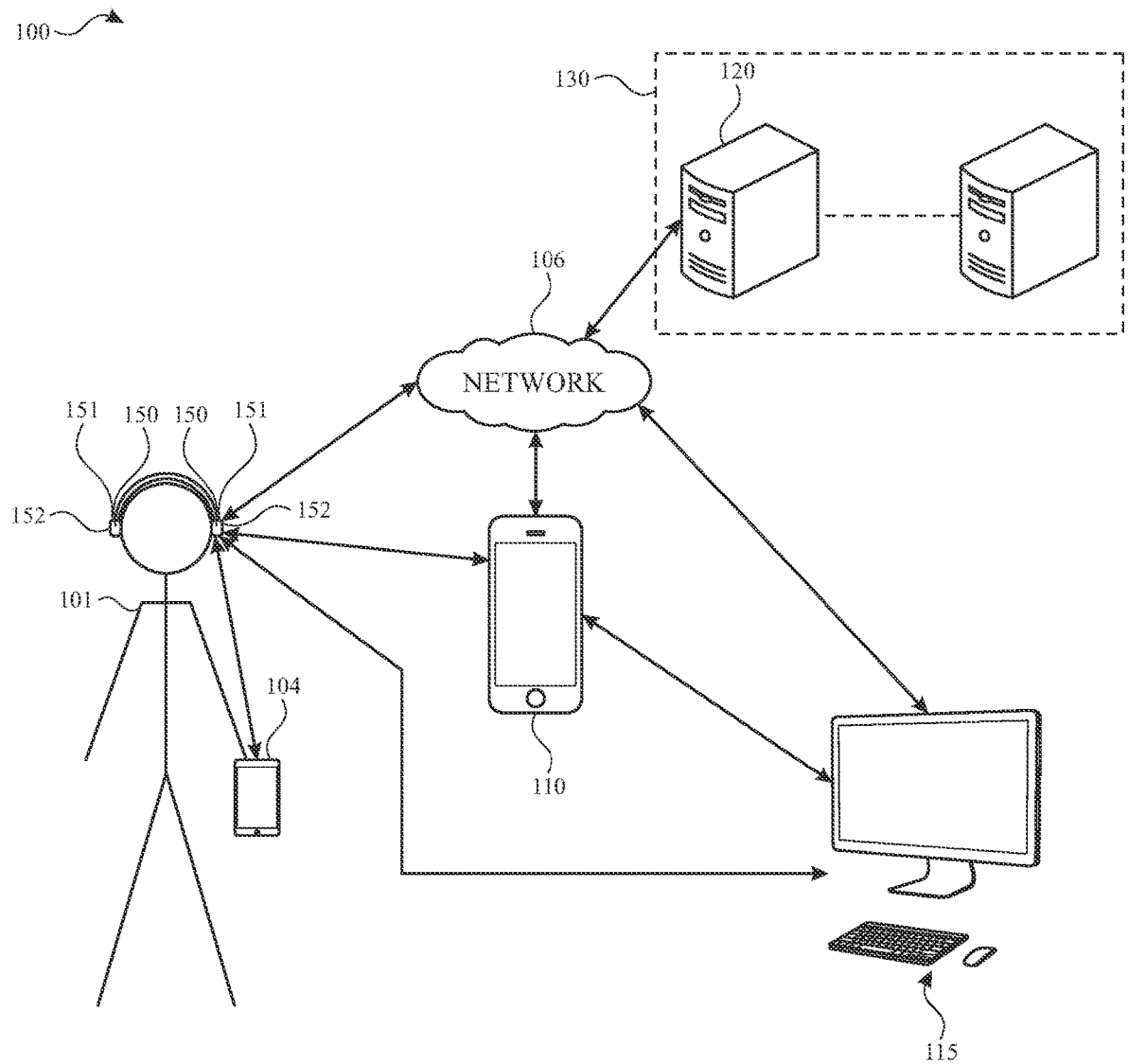
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Neural networks for speech enhancement (e.g., speech separation, noise reduction) generally require a large number of parameters in order to handle various noise conditions encountered in real environments. Low resource devices, such as audio devices (e.g., earbuds or headphones) may not have enough memory and/or processing power to run such large networks. In many operational scenarios, audio devices may be communicatively connected, by a wired or wireless connection, to a companion device that has more memory and/or computing power than the audio device. In some scenarios, the audio device may transmit audio input data via a wireless connection to the companion device for processing such as source separation (e.g., for speech enhancement or other noise suppression or sound enhancement). However, the continuous transfer of audio data to the companion device, and of processed audio data back to the audio device, can create an undesirable latency, and also cause its own drain on power and/or computing resources for handling the exchanges of data.

In accordance with aspects of the disclosure, audio source separation is provided for low-resource devices by providing small-footprint specialized source separation networks (SFSSNs) that can be uploaded and run on the low-resource device, depending on the noise characteristics of a current environment as determined by a scene analysis network that runs on the companion device. The companion device can select an SFSSN from a bank of precomputed networks stored at the companion device according to the current noise environment. In one or more implementations, the companion device can select the SFSSN based on a current perceptual goal and/or listening context of the user, and/or a desired processing mode, in addition to the noise characteristics of the current environment.

Each of the SFSSNs can be trained (e.g., pre-trained off-line) on a specific type of noise, and can each thus require a smaller number of parameters than a generic source separation network. In this way, SFSSNs can be provided that can be efficiently run on the low-resource device. In one or more implementations, if noise conditions change, or a different perceptual goal is desired, the scene analysis network at the companion device may identify a new noise type based on new audio data (e.g., obtained directly at the companion device and/or sent from the low-resource device) and can select a new SFSSN from the bank of precomputed networks stored at the companion device, based on the new noise condition.

Implementations of the subject technology described herein provide a low latency audio source separation for devices, such as earbuds, with limited processing and/or storage capacity. In various implementations, the audio source separation can be used for speech enhancement, noise reduction, speech separation, enhancing sounds from particular sources or speakers, or enhancing sounds from nearby sources or sources at particular locations or directions (as examples).

The low latency can be provided by leveraging processing power of a companion device such as a smart watch, a smartphone, or a tablet device. Audio information, such as encoded information based on audio input to the earbud, can be provided to the companion device. A scene analyzer model at the companion device may identify, based on a noise condition in the audio information, one of a set of small-footprint source separation models that are pre-stored at the companion device, each corresponding to a particular noise condition. The companion device then provides the identified small-footprint source separation model to the earbud for source separation and related actions at the audio device.

In one or more implementations, an initial scene analysis may be performed at the earbuds prior to providing audio information to the companion device. The initial scene analysis may include, for example, detection of a change in noise conditions using a lightweight scene analyzer at the earbuds.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes a media output device 150, an electronic device 104 (e.g., a handheld electronic device such as a smartphone or a tablet), an electronic device 110, an electronic device 115, and a server 120 communicatively coupled by a network 106 (e.g., a local or wide area network). For explanatory purposes, the system architecture 100 is illustrated in FIG. 1 as including the media output device 150, the electronic device 104, the electronic device 110, the electronic device 115, and the server 120; however, the system architecture 100 may include any number of electronic and/or audio devices and any number of servers or a data center including multiple servers.

The media output device 150 may be implemented as an audio device such as a smart speaker, headphones (e.g., a pair of speakers mounted in speaker housings that are coupled together by a headband), or an earbud (e.g., an earbud of a pair of earbuds each having a speaker disposed in a housing that conforms to a portion of the user's ear) configured to be worn by a user (also referred to as a wearer when the audio device is worn by the user), or may be implemented as any other device capable of outputting audio, video and/or other types of media (e.g., and configured to be worn by a user). Each media output device 150 may include one or more speakers such as speaker 151 configured to project sound into an ear of the user 101, and one or more microphones such as microphone 152 configured to receive audio input such as external noise input and/or external voice inputs. In one or more implementations, the media output device 150 may include display components for displaying video or other media to a user. Although not visible in FIG. 1 (see, e.g., FIG. 3), each media output device may include processing circuitry (e.g., including memory and/or one or more processors) and communications circuitry (e.g., one or more antennas, etc.) for receiving and/or processing audio content from one or more of the electronic device 104, the electronic device 110, the electronic device 115, and/or the server 120. The processing circuitry of the media output device 150 or another device may operate the speaker 151 to generate the sound. The memory may store one or more machine learning models for audio source separation and/or detection of changes in noise conditions.

The media output device 150 may include communications circuitry for communications (e.g., directly or via network 106) with the electronic device 104, the electronic device 110, the electronic device 115, and/or the server 120, the communications circuitry including, for example, one or more wireless interfaces, such as WLAN radios, cellular radios, Bluetooth radios, Zigbee radios, near field communication (NFC) radios, and/or other wireless radios. The electronic device 104, the electronic device 110, an electronic device 115, and/or the server 120 may include communications circuitry for communications (e.g., directly or via network 106) with media output device 150 and/or with the others of the electronic device 104, the electronic device 110, the electronic device 115, and/or the server 120, the communications circuitry including, for example, one or more wireless interfaces, such as WLAN radios, cellular radios, Bluetooth radios, Zigbee radios, near field communication (NFC) radios, and/or other wireless radios. The media output device may include a power sources such as a battery and/or a wired or wireless power source.

The media output device 150 may be communicatively coupled to a companion device such as the electronic device 104, the electronic device 110 and/or the electronic device 115. Such a companion device may, in general, include more computing resources (e.g., memory and/or processing resources) and/or available power in comparison with the media output device 150. In an example, media output device 150 may operate in various modes. For instance, the media output device 150 can operate in a first mode of operation (e.g., a transparent mode of operation) in which audio content (e.g., from electronic device 104) is played without removing or suppressing at least portions of an audio input, or in a second mode of operation (e.g., a noise-cancelling mode of operation) in which the audio content is played while removing or cancelling all external audio input (e.g., by filtering out external audio input and/or by generating an out-of-phase noise cancelling signal to cancel out the audio input) with the media output device 150. In the first mode of operation, the media output device may perform source separation operations on incoming external audio input and may remove, cancel, suppress, and/or enhance various components of the separated incoming external audio input. In the second mode of operation, the media output device may perform source separation operations on the incoming external audio input to suppress, cancel, or remove all of the incoming external audio input from the sound that enters the user's ear.

The source separation operations performed by the media output device 150 may use a source separation model that is specific to a current noise condition of the environment in which the media output device is being operated, the source separation model having been selected and provided by a companion device such as the electronic device 104, the electronic device 110 and/or the electronic device 115. In one or more implementations, the memory of media output device 150 may store one or more machine learning models (referred to herein as lightweight classification models or classification models) for locally detecting that a change in noise conditions has occurred (e.g., without the capability of identifying or classifying the particular noise condition).

Media output device 150 may also include one or more sensors such as touch sensors and/or force sensors for receiving user input. For example, a user/wearer of media output device 150 may tap a touch sensor or pinch the force sensor briefly to control the audio content being played, to control volume of the playback, and/or to switch between modes of operation, such as the transparent and noise-cancelling modes of operation. In one or more implementations, the user may hold down the force sensor while the media output device is operated in the noise-cancelling mode of operation to temporarily switch to the transparent mode of operation until the force sensor is released.

The electronic device 104 may be, for example, a smartphone, a portable computing device such as a laptop computer, a peripheral device (e.g., a digital camera, headphones, another audio device, or another media output device), a tablet device, a wearable device such as a smart watch, a smart band, and the like, any other appropriate device that includes, for example, processing circuitry and/or communications circuitry for providing audio content to media output device(s) 150. In FIG. 1, by way of example, the electronic device 104 is depicted as a mobile smartphone device with a touchscreen. In one or more implementations, the electronic device 104 and/or the media output device 150 may be, and/or may include all or part of, the electronic device discussed below with respect to the electronic system discussed below with respect to FIG. 9.

The electronic device 115 may be, for example, desktop computer, a portable computing device such as a laptop computer, a smartphone, a peripheral device (e.g., a digital camera, headphones, another audio device, or another media output device), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 9.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for computer-generated reality environments. In an implementation, the server 120 may function as a cloud storage server.

Figure 2:
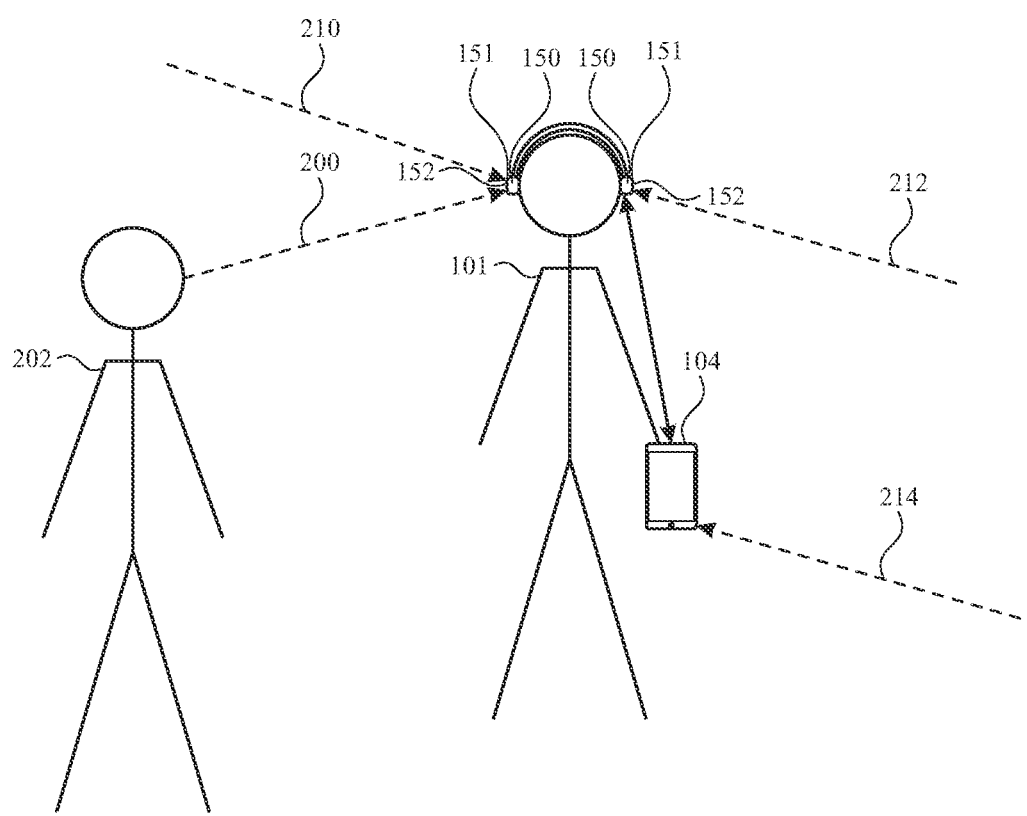
FIG. 2 illustrates an example of an environment that includes a media output device receiving various audio inputs in accordance with implementations of the subject technology.

FIG. 2 illustrates an environment in which a user 101 is wearing one or more media output devices 150. The one or more media output devices 150 may receive and play audio content, from electronic device 104, using speaker(s) 151.

In the example of FIG. 2, various audio inputs are received by a microphone 152 of each media output device 150. For example, FIG. 2 illustrates an audio input 200 corresponding to a voice input from a person 202 (e.g., a speaker) other than the user 101 of the media output device 150 that may be received by the microphone 152 of media output device 150 (e.g., when the person 202 speaks to the user 101). FIG. 2 also illustrates how other audio inputs, such as audio input 210 and audio input 212 may be received by one or more microphones 152 of one or more media output devices 150 from the environment of the user 101. In various operational scenarios, audio input 210 and audio input 212 may correspond to audio inputs from a common general noise source, such as ambient noise from the environment (e.g., ambient noise from a vehicle such as an airplane when the user 101 is in the vehicle). In other operational scenarios, the audio input 210 and the audio input 212 may be different audio inputs. For example, the audio input 210 may be a desired audio input (e.g., a siren, an announcement, or a voice of a desired speaker) that the user 101 desires to have transmitted via the media output device to the user's ear, and the audio input 212 may be an undesired audio input (e.g., noise from an open window or other noise source).

In various operational scenarios in which the user 101 is wearing two media output devices 150 (e.g., implemented as a pair of earbuds), any or all of audio inputs 200, 210, and/or 212 can be received by only one of the two media output devices, equally by both of the media output devices, or at different loudness levels by the two different media output devices. For example, when two media output devices 150 (e.g., a pair of earbuds) are worn in the two ears of a user, the two media output devices are separated by a distance (e.g., the width of the user's head) that can be known or estimated. In one or more implementations, the two media output devices 150 can determine the distance and/or the angular position for the source of each of one or more of the external audio inputs (e.g., the distance and/or angular position of the source of audio input 200 corresponding to the location of the person 202) relative to the locations of the media output devices. In one or more implementations, a companion device such as electronic device 104 may select a source separation model to provide to media output device(s) 150 based on the content of external audio input, based on one or more determined locations of one or more sources of external noise input, and/or based on an angular range and/or distance from which a user desires to hear audio input. In one or more implementations, the selected source separation model may be provided to both of a pair of earbuds from the electronic device 104, to a primary one of a pair of earbuds for source separation operations only at the primary one of the earbuds, and/or to a primary earbud for source separation operations the primary earbud and for distribution from the primary earbud to a secondary earbud for source separation operations at the secondary earbud.

In one or more implementations, electronic device 104 may determine (e.g., based on user input, device context information, and/or learned user behavior) that a user desires to enhance speech within a range of interest such as a distance range or an angular range of interest, to remove undesired noise without distortion to sound content within the range of interest, to remove undesired noise and preserve potential content of interest from all directions and/or distances, to remove all but salient and/or nearby sounds, and/or to cancel all external audio input (e.g., from all distances and/or angular positions). As described in further detail hereinafter, these perceptual goals of the user may be provided to a scene analyzer model or other network selection or generation engine at a companion device, for selection of a source separation model to provide to an audio device for performance of source separation operations to achieve that perceptual goal in a current noise condition.

As illustrated in FIG. 2, in one or more implementations, additional audio input such as audio input 214 may also be received directly at a companion device such as electronic device 104. In one or more implementations, audio input 214 may be used by electronic device 104 to detect a change in a noise condition, and/or may be provided to a scene analyzer model to enhance selection of a source separation model to provide to a media output device 150.

Figure 3:
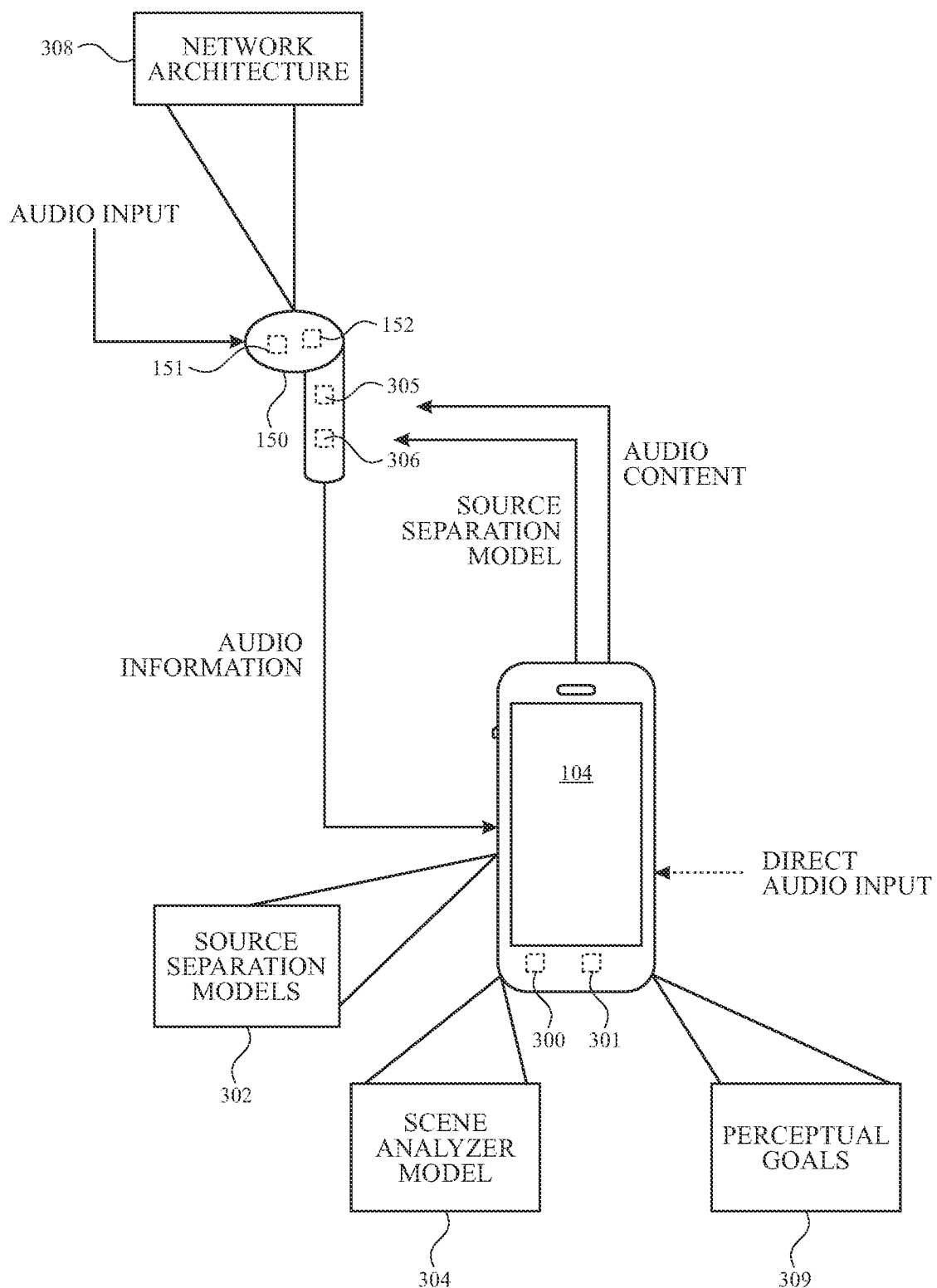
FIG. 3 illustrates a schematic diagram illustrating a media output device in communication with a companion electronic device in accordance with implementations of the subject technology.

FIG. 3 is a schematic diagram that illustrates various information and/or operations that can be utilized by electronic device 104 and/or media output device 150 to provide source separation for audio input, according to aspects of the disclosure. As illustrated in FIG. 3, media output device 150 may include a speaker 151, a microphone 152, memory 305, and processing circuitry such as processor 306. The processing circuitry may operate the speaker 151 to play audio content received from the electronic device 104, and/or operate the speaker 151 to pass through some or all of the audio input received at the microphone 152 from the external environment. In one or more implementations, the processor 306 may execute a source separation model received from the electronic device 104 to remove, suppress, and/or enhance various portions of the audio input before those portions pass through to the user's ear.

As shown in FIG. 3, the electronic device 104 may also include one or more processors such as processor 301 that can provide the audio content and/or one or more source separation models to the media output device 150. As illustrated in FIG. 3, electronic device 104 may include memory 300 storing a plurality of source separation models 302. The source separation models 302 may each be trained to provide audio source separation in a corresponding noise condition.

For example, source separation models 302 may include one or more source separation models that are trained to separate audio inputs in a quiet indoor environment (e.g., in an office building), one or more source separation models that are trained to separate audio inputs in a noisy indoor environment (e.g., an indoor environment in which a television is playing, a crowd of people is talking, vehicle noise is present, or an appliance such as a dishwasher, a washing machine, a vacuum, a clothes dryer, a hair dryer or other appliance is operating), one or more source separation models that are trained to separate audio inputs in a quiet an outdoor environment (e.g., a nature environment), one or more source separation models that are trained to separate audio inputs in a noisy outdoor environment (e.g., in traffic, at a concert, in a crowd, etc.), and/or other source separation models that are each trained to separate audio inputs in a corresponding noise condition. In one or more implementations, source separation models 302 may include one or more source separation models that are trained to separate audio inputs at one or more corresponding signal-to-noise ratios.

As shown in FIG. 3, an audio device such as media output device 150 may receive an audio input (e.g., using a microphone 152). The audio input may include one or more components, such as one or more noise components, voice components, or the like. For example, the audio input of FIG. 3 may include the audio input 200, the audio input 210, and/or the audio input 212 of FIG. 2, along with audio input generated by any other noise or sound sources in the environment of the media output device 150.

The audio device may provide audio information that is based on the audio input (e.g., the audio input itself or encoded information generated from or extracted from the audio input, or a noise characteristic such as a signal-to-noise ratio of the audio input) to a companion device such as electronic device 104. The electronic device 104 may provide the audio information received from the audio device (e.g., media output device 150) to a machine learning model at the electronic device 104, such as scene analyzer model 304. Responsive to the audio information as input, the scene analyzer model 304 may generate an output that can be used to select one of the source separation models 302. As an example, the output may include an identifier of one of the source separation models 302 corresponding to a noise condition in the audio information, an identifier of the noise condition in the audio information (e.g., a noise condition identifier with which one of the stored source separation models 302 is stored and can be selected), and/or a set of parameters for a source separation model corresponding to the noise condition in the audio information.

In one or more implementations, the electronic device 104 may also obtain direct audio input (e.g., using a microphone of the electronic device) and may provide the direct audio input to the scene analyzer model as additional input data. The direct audio input may also, or alternatively, be provided to another machine learning model at the electronic device 104, such as a classification model for detecting a change in a noise condition that triggers an update to the source separation model, in one or more implementations. In one or more implementations, other contextual data may be used by the electronic device 104 to detect a change in a noise condition that triggers an update to the source separation model. For example, one or more sensors of the electronic device (e.g., a global positioning system (GPS) sensor, or a motion sensor) may detect a change in a physical location of the electronic device that can indicate a likely change in scene noise (e.g., when the device is moved from outside to inside, from inside to outside, into a venue known to be noisy (e.g., a concert venue) or known to be quiet (e.g., a research library), or moved more than a threshold distance and/or with one or more types of motion such as walking motion).

In one or more implementations, the electronic device 104 may also provide one or more perceptual goals 309 to the scene analyzer model 304 as additional inputs to inform the selection of one of the source separation models 302 and/or the generation of a source separation model. The perceptual goals 309 may be determined by a user input (e.g., a user specified goal such as a goal to a reduce stationary noise as selected by a user in an airplane or other vehicle, a goal to enhance spoken input originating within angular range, a goal to remove undesired noise without distortion to sound content within angular range, a goal to remove one or more types of undesired noise or all noise, a goal to cancel general noise and pass through potential content of interest from all directions, a goal to remove all but salient and/or nearby sounds, and/or a goal to block all external sound) or can be automatically determined by the electronic device 104. For example, the electronic device 104 may determine one or more perceptual goals based on a context of the electronic device 104 and/or the media output device 150 (e.g., based on context information such as an indication that the user of media output device 150 and electronic device 104 is currently listening to music, currently on a telephone call or in a video conference, currently in conversation with a single person, currently in a crowd of people talking, currently using the media output device in a full noise cancelling mode, currently wearing the media output device while viewing visual content on the electronic device 104, or currently using the media output device in a sound amplification mode—as examples).

As illustrated in FIG. 3, the electronic device 104 may provide a source selection model (e.g., a selected one of the source separation models 302 and/or a source separation model generated by the electronic device 104) as identified using the scene analyzer model 304 to the media output device 150.

In one or more implementations, the audio device (e.g., media output device 150) may store a network architecture 308 (e.g., a convolutional neural network of a given size). In these implementations, the source separation model that is provided from electronic device 104 may be a set of weights and/or other parameters for the network architecture 308 at the audio device that can be used in the network architecture 308. In other implementations, the source separation model that is provided by the electronic device 104 may include the network architecture and the corresponding weights and/or other parameters.

In one or more other implementations, a portion of the network architecture can be implemented at the media output device 150 and another portion of the network architecture can be implemented at the electronic device 104, and the processor 301 of the electronic device 104 may cooperate with the processor 306 of the media output device 150 to execute the source separation model (e.g., by exchanging activations and/or other intermediate values between the electronic device 104 and the media output device 150 during execution of the model). In these implementations, the output of the source separation model may be generated at the media output device 150 or generated at the electronic device 104 and provided to the media output device.

Once a source separation model has been provided to the media output device 150, the media output device 150 may execute the source separation model (e.g., using processor 306) to provide source separation of additional audio input (e.g., according to a perceptual goal) received by the microphone 152 of the media output device 150.

In one or more implementations, the scene analyzer model 304 and/or the source separation models 302 may be trained at the electronic device 104, or may be trained separately (e.g., at a server) and loaded onto the electronic device. Scene analyzer model 304 may be implemented as one or more machine learning models that are trained to identify, based at least in part on audio information received from an audio device such as media output device 150, a noise condition in the audio information. Each of the source separation models 302 may be implemented as a machine learning model that is trained to separate (e.g., and remove, suppress, and/or enhance) various components of an incoming audio stream in a particular corresponding noise condition. In various implementations, the source separation models may be pre-trained using a training operation that partitions noise space into sound classes or noise conditions and stored in a database at an electronic device such as electronic device 104, or the source separation models may be generated on-the-fly by the scene analysis network (e.g., a network-generating network) at the electronic device 104.

Figure 4:
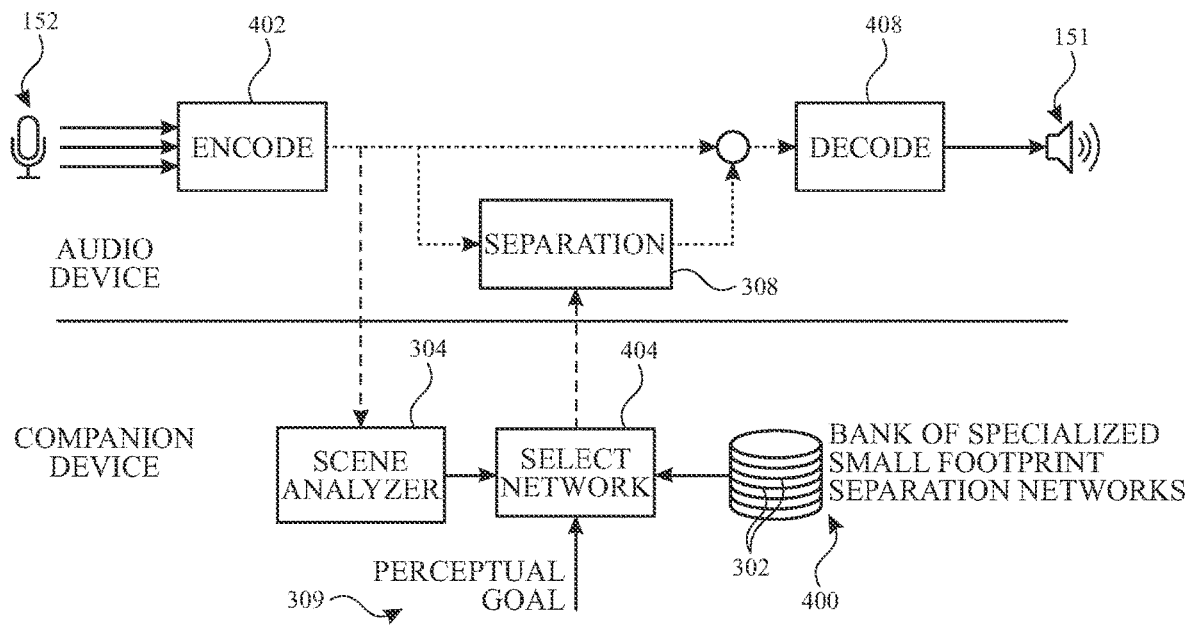
FIG. 4 illustrates a schematic diagram of an example data flow for source separation in accordance with one or more implementations of the subject technology.

For example, FIG. 4 illustrates an example in which the noise space has been partitioned into sound classes or noise conditions, and a source separation model is stored at a companion device for each sound class or noise condition. As shown in the example of FIG. 4, a companion device such as electronic device 104 may include a database 400 that stores a bank of machine learning models (e.g., source separation models 302) that are each trained for source separation in a corresponding noise condition. For example, each of the machine learning models in the database 400 may be a small footprint source separation network (SFSSN) as described herein.

In the example of FIG. 4, an audio device such as media output device 150 captures audio input with a microphone (e.g., microphone 152). In one or more implementations, the audio device includes an encoder 402 that encodes the audio input to generate audio information (e.g., frequency encoded audio information generated by a frequency encoder implementation of encoder 402, or audio parameters generated by neural network implementation of the encoder 402 responsive to receiving the audio input).

As shown, the audio information from encoder 402 can be transmitted (e.g., via a wireless connection such as a Bluetooth connection) to a companion device such as electronic device 104. In one or more implementations, encoder 402 may reduce a dimensionality or a rate of transmission of the audio data in order to provide enough audio information to the companion device for scene analyzer model 304 to operate, without using the bandwidth that would be used to transfer all of the audio input to the companion device. The companion device provides the received audio information to scene analyzer model 304. In the example of FIG. 4, the scene analyzer model 304 provides an output to a selection network 404. For example, the output of the scene analyzer model 304 may be an indicator of a noise condition in the audio input. As shown, the selection network may also receive one or more perceptual goals. In one or more implementations, (although not explicitly shown in FIG. 4), the selection network 404 may also receive context information as described herein from the electronic device.

As indicated in FIG. 4, the selection network 404 may select a source separation model 302 from the database 400 of source separation models, according to the output of the scene analyzer model 304 (e.g., according to the identified noise condition) and, optionally, based on the perceptual goal(s) and/or context information. As shown, the selected source separation model may be provided to a separation engine (e.g., the network architecture 308 of FIG. 3) at the audio device. Additional (e.g., ongoing) audio information from the encoder 402 (e.g., based on additional, ongoing audio input to the microphone 152) may be provided to the network architecture 308 implementing the received source separation model for source separation operations (e.g., including removal, suppression, and/or enhancement of various components of the audio input) to generate output audio information for a decoder 408. The decoder may decode the source-separated audio information (e.g., including the components of the audio input as desired by the user based on the perceptual goal(s) and/or the context information used to select the source separation model at the companion device) to provide audio output to the user (e.g., using speaker 151).

It is appreciated that, although the scene analyzer model 304 and the selection network 404 are shown as separate modules in FIG. 4, in one or more implementations, the selection network may be implemented as a part of the scene analyzer model 304 (e.g., resulting in the scene analyzer model receiving the perceptual goal(s) and/or context information, and outputting a selection or identifier of one of the source separation models 302).

Although examples are described herein in which the source separation models 302 are trained to provide source separation in a particular noise condition, it should also be appreciated that one or more of source separation models 302 may be trained to select for one or more respective primary audio sources (e.g., to select for emergency sounds such as sirens or to select for known or unknown speakers). For example, in one or more implementations, perceptual goals 309 may include a perceptual goal of enhancing a voice of a particular person or a general person within a range of locations. In one or more implementations, scene analyzer model 304 may be provided with perceptual goal that includes a speaker ID of the particular person and select a source separation model that has been trained to enhance the voice of that person. In implementations in which an electronic device stores one or more source separation models that are trained to detect and/or identify a voice of a particular person, those source separation models and/or any training data used to train those source separation models may be stored in secure storage at the electronic device, and only after obtaining permission from the particular person to obtain and/or store such data.

Figure 5:
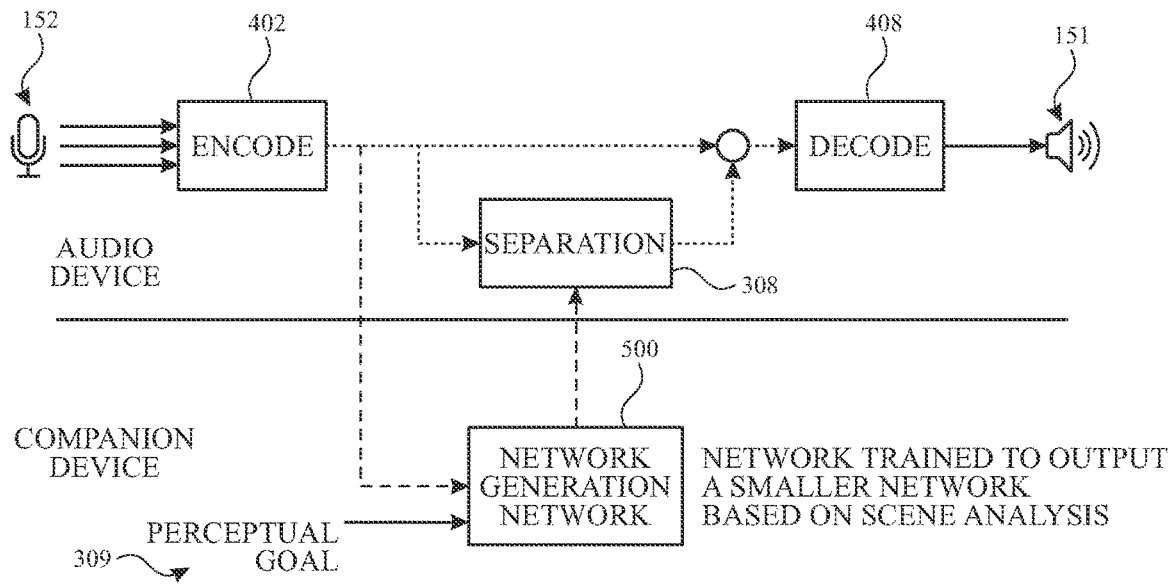
FIG. 5 illustrates a schematic diagram of another example data flow for source separation in accordance with one or more implementations of the subject technology.

It is also appreciated that, in one or more implementations, instead of selecting a pre-stored source separation model at the electronic device 104, the electronic device may generate the source separation model (e.g., on-the-fly). For example, FIG. 5 illustrates an implementations in which the scene analyzer model 304 and/or the selection network 404 of FIG. 4 are replaced by a network generation network 500. As shown, the network generation network 500 may receive encoded audio information from encoder 402 of the audio device (e.g., and/or one or more perceptual goals 309 and/or context information), and may output a source separation model (e.g., a set of weights and/or other parameters for the network architecture 308) that is then provided from the companion device to the audio device.

Because scene analysis can use power and/or computing resources that are not available or are limited at the audio device, the operations described above in connection with FIGS. 4 and 5 in which scene analysis is performed at a companion device, can facilitate on-device source separation capabilities for an audio device that would otherwise be difficult or impossible to provide for varying noise conditions.

As described herein, in one or more implementations, a companion device for an audio device may provide one or more options for a user to select one or more perceptual goals and/or other context information, to inform the selection and/or generation of a source separation model for the audio device. In one or more implementations, perceptual goals may be selected from a pre-determined set of selectable goals. In other implementations, the companion device may provide a user interface that can receive user input to tune the source selection that is performed by the audio device.

Figure 6:
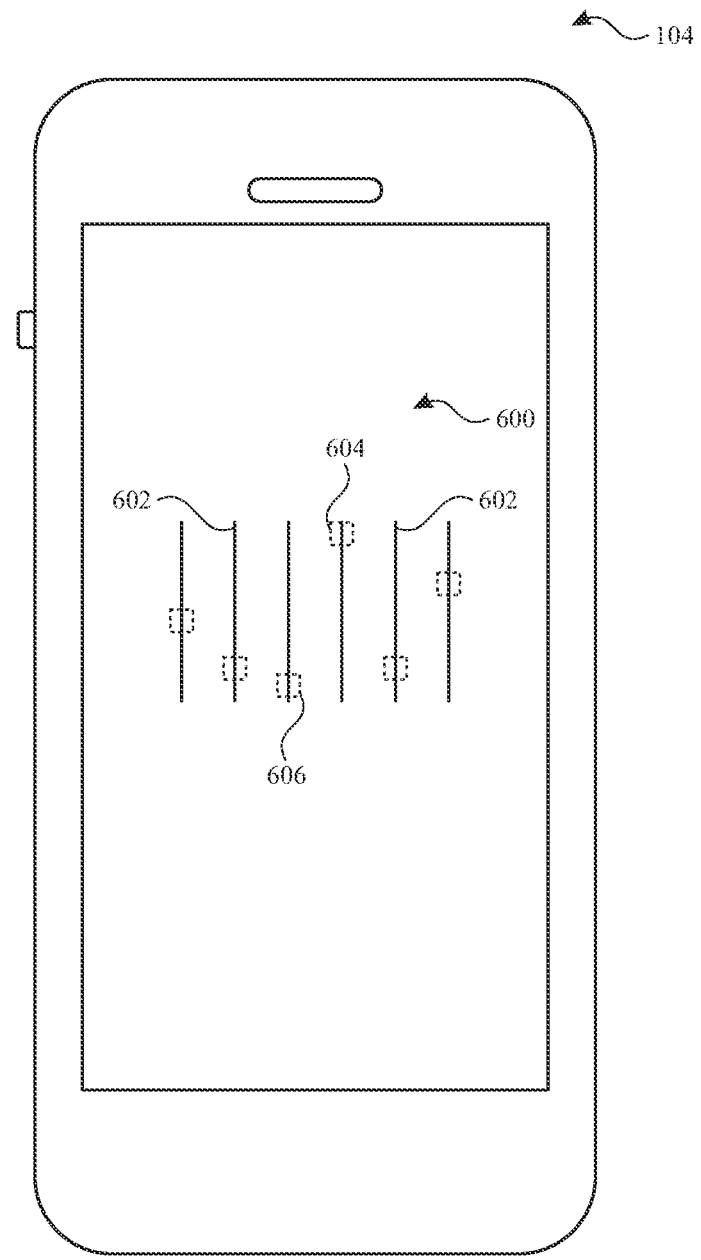
FIG. 6 illustrates a user interface of a companion device in accordance with implementations of the subject technology.

For example, FIG. 6 illustrates an example in which a companion device (e.g., electronic device 104) provides a user interface that includes a tuner 600. In the example of FIG. 6, the tuner 600 includes multiple sliders 602 that each corresponds to a primary audio source (e.g., a known speaker, device generated audio content, etc.) or a noise source (e.g., traffic noise, crowd noise, ambient noise, appliance noise, directional noise, etc.). The user of electronic device 104 may raise or lower the slider 602 corresponding to a particular audio source to cause suppression, removal, or enhancement of that audio source. For example, in FIG. 6, a slider 602 corresponding to a primary audio source is in a maximum position 604 to cause enhancement of that audio source for output to the user, and a slider 602 corresponding to a noise source is in a minimum position 606 to cause removal of that noise source from the audio output. Slider positions in between the minimum and the maximum positions may cause correspondingly less or more aggressive enhancement or suppression of a particular audio source for that slider. In one or more implementations, the electronic device 104 may generate perceptual goals (e.g., weights) according to the slider positions, that can be provided to a scene analyzer model 304, selection network 404, and/or network generating network 500 to influence the selection and/or generation of a source separation model to be provided to the audio device. Although a tuner is shown in FIG. 6, this is illustrative, and other user interfaces for receiving user input of perceptual goals are contemplated.

Figure 7:
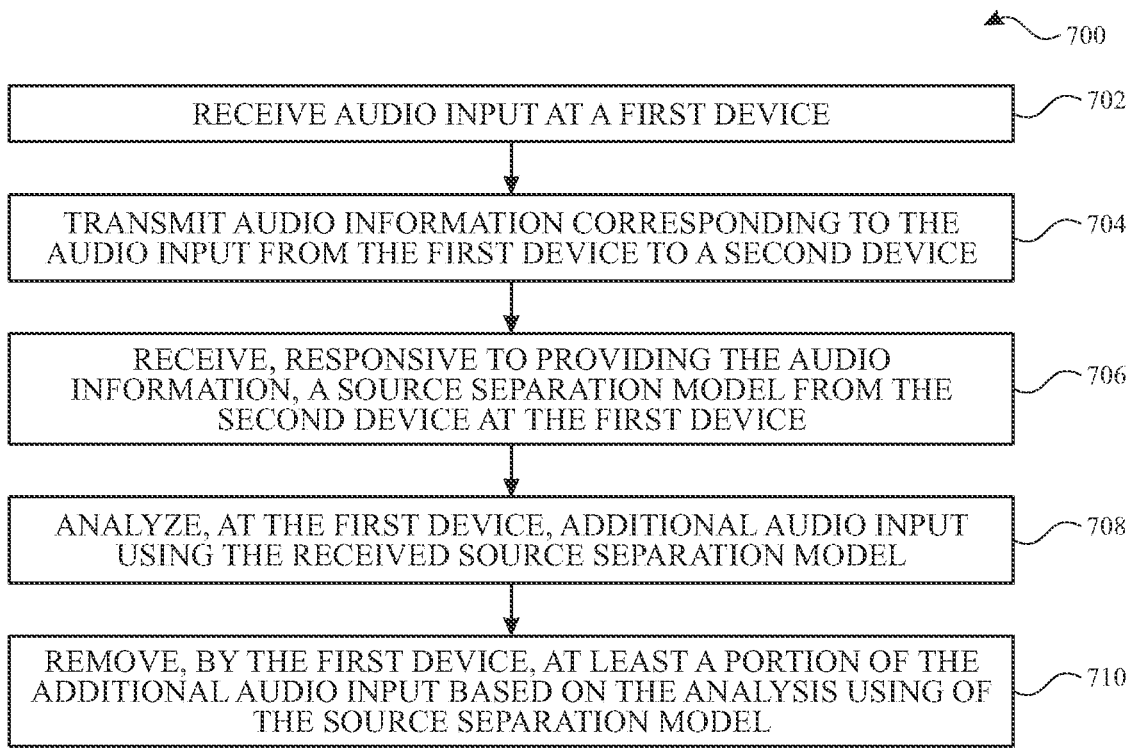
FIG. 7 illustrates a flow diagram for an example process for operating a media output device in accordance with implementations of the subject technology.

FIG. 7 illustrates a flow diagram of an example process 700 for operating a media output device such as an audio output device, in accordance with implementations of the subject technology. For explanatory purposes, the process 700 is primarily described herein with reference to the media output device 150 and electronic device 104 of FIGS. 1-3. However, the process 700 is not limited to the media output device 150 and electronic device 104 of FIGS. 1-3, and one or more blocks (or operations) of the process 700 may be performed by one or more other components of other suitable devices, including the electronic device 110, the electronic device 115, and/or the servers 120. Further for explanatory purposes, some of the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

As illustrated in FIG. 7, at block 702, audio input may be received at a first device (e.g., an audio device such as media output device 150). For example, the audio input may be received using a microphone of the first device. The audio input may include, as examples, the audio input 210, the audio input 212, and/or the audio input 200 described above in connection with FIG. 2.

At block 704, audio information corresponding to the audio input may be transmitted from the first device to a second device (e.g., electronic device 104). For example, the audio information may be encoded audio information generated from the audio input, such as encoded audio information generated by the encoder 402 of FIG. 4 and/or FIG. 5. For example, the first device may be an earbud (e.g., a first earbud of a pair of earbuds) and the second device may be a companion device that is paired with the earbud. For example, the companion device may be a wearable device, a smartphone or a tablet device. In one or more implementations, the audio information corresponding to the audio input may be a signal-to-noise ratio (SNR) of the audio input (e.g., as determined by an audio device such as media output device 150).

At block 706, the first device receives, responsive to providing the audio information, a source separation model (e.g., a source separation model 302) from the second device. For example, the source separation model may correspond to a noise condition identified by the second device in the audio information. For example, the source separation model may be one of several source separation models stored at the second device, each source separation model corresponding to a respective noise condition. Receiving the source separation model may include receiving a set of weights for a network architecture at the first device. The network architecture may be, for example, a convolutional neural network architecture in which weights and/or other parameters corresponding to the received source separation model can be implemented. In one or more implementations, the first device may be an earbud of a pair of earbuds, and the first device may provide the received source separation model to the other earbud of the pair (e.g., via a wireless connection between the earbuds).

At block 708, the first device may analyze additional audio input using the received source separation model. For example, analyzing the additional audio input may include providing additional audio information (e.g., encoded audio information encoded by encoder 402 of FIG. 4) to a network architecture at the first device that implements a set of weights received in the source separation model, to identify and/or separate various components of the audio input.

At block 710, the first device may remove at least a portion (e.g., a noise portion) of the additional audio input based on the analysis using of the source separation model. The first device may provide an audio output from the first device (e.g., using a speaker of the first device) based on a remaining portion of the additional audio input. As one illustrative example, provide the audio output based on the remaining portion of the additional audio input may include outputting a voice of a nearby person while suppressing the sound of a jackhammer at a nearby construction site. Removing or suppressing a noise portion of an audio input as identified using the received source separation model, may include filtering the identified noise portion, or generating an out-of-phase noise-cancelling signal, based on the identified noise portion, to remove or suppress the identified noise portion. In one or more implementations in which the first device is an earbud of a pair of earbuds and the earbud provides the source separation model to the other earbud of the pair, the other earbud may also perform the operations of blocks 708 and 710 at that earbud.

In one or more implementations, the first device may detect a change in a noise condition with a classification model (e.g., a lightweight classification model that can detect a change in noise condition but is not trained to identify a particular noise condition) at the first device. The first device may provide an indication of the detected change to the second device. The first device may receive, from the second device following the indication, a new source separation model. The first device may the perform additional source separation operations for ongoing audio input using the new source separation model corresponding to the new noise condition.

In one or more implementations, further audio input may be received at a third device (e.g., a second earbud in the pair of earbuds). For example, the first and third devices may be first and second earbuds of a pair of earbuds, and the second device may be a companion device that is wirelessly connected to the pair of earbuds. The third device may transmit further audio information corresponding to the further audio input (e.g., encoded audio information generated from the further audio input) to the second device (e.g., the companion device). The third device may receive, responsive to providing the further audio information, an additional source separation model from the second device. The third device may analyze, concurrently with the analyzing at the first device, further additional audio input using the received additional source separation model. The third device may remove, concurrently with the removing at the first device, at least a portion of the further additional audio input based on the analysis using the additional source separation model. For example, the source separation model may correspond to a noise condition identified by the second device in the audio information and the additional source separation model may correspond to a different noise condition identified by the second device in the further audio information (e.g., in a scenario in which a user is wearing two earbuds and different noise conditions exist on the two sides of the user, such as when a user is riding in a car listening to another passenger speak on one side of the user and with an open window on the other side of the user).

Figure 8:
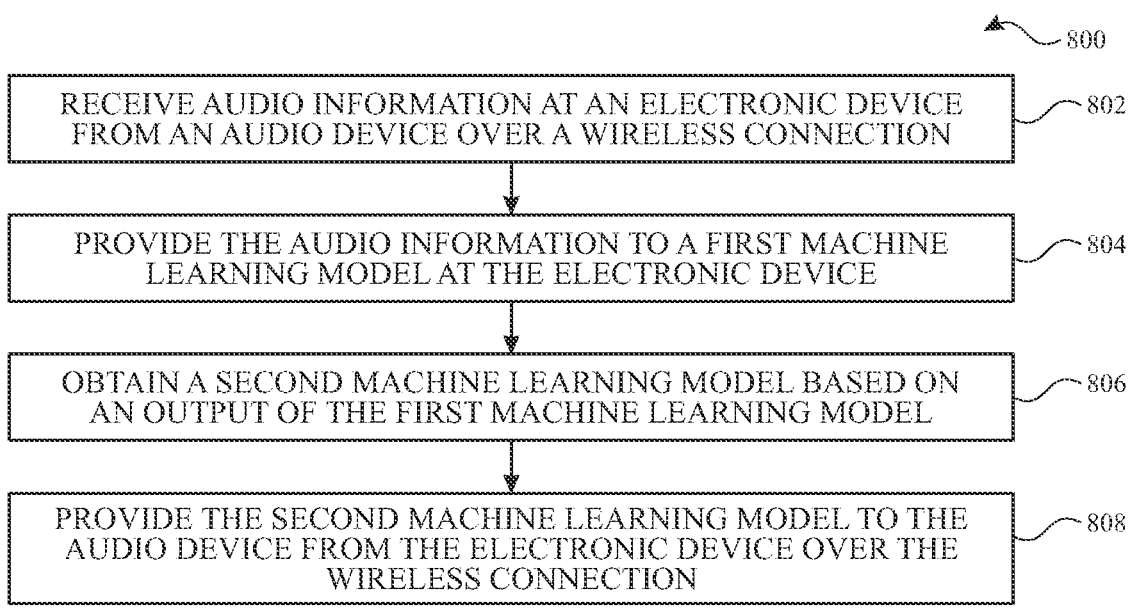
FIG. 8 illustrates a flow diagram for an example process for operating a companion device of a media output device in accordance with implementations of the subject technology.

FIG. 8 illustrates a flow diagram of an example process 800 for operating an electronic device, in accordance with implementations of the subject technology. For explanatory purposes, the process 800 is primarily described herein with reference to the media output device 150 and electronic device 104 of FIGS. 1-3. However, the process 800 is not limited to the media output device 150 and electronic device 104 of FIGS. 1-3, and one or more blocks (or operations) of the process 800 may be performed by one or more other components of other suitable devices, including the electronic device 110, the electronic device 115, and/or the servers 120. Further for explanatory purposes, some of the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

As illustrated in FIG. 8, at block 802, audio information may be received at an electronic device (e.g., electronic device 104) from an audio device (e.g., a media output device 150) over a wireless connection. As examples, the audio information may include an audio sample corresponding to an audio input received at the audio device, an encoded audio sample of an audio input received at the audio device, and/or one or more characteristics (e.g., a signal-to-noise ratio or other noise characteristic) of the audio input received at the audio device.

At block 804, the audio information may be provided to a first machine learning model at the electronic device. For example, the first machine learning model may be a scene analyzer model such as scene analyzer model 304 or a network generation network such as network generation network 500. In one or more implementations, the electronic device may also provide a perceptual goal for the audio information as an additional input to the first machine learning model. In various implementations, the perceptual goal may be provided by a user of the electronic device or the perceptual goal may be determined by the electronic device based on a context of the electronic device. For example, the context of the electronic device may be a listening context such as an in-conversation context (e.g., in which the user of the electronic device is in conversation with a person directly or via the electronic device 104), a critical listening context (e.g., in which the user is listening to a live lecturer or content provided by the electronic device), a general listening context (e.g., in which the user is listening to a group discussion), a focused but aware context (e.g., in which the user is viewing content on a display of the electronic device), or a total focus context (e.g., in which the user is viewing content on a display of the electronic device with audio devices in a noise-cancelling mode or a in which the user is viewing audio-visual media using the electronic device).

At block 806, the electronic device may obtain a second machine learning model based on an output of the first machine learning model. Obtaining the second machine learning model may include selecting the second machine learning model from a database (e.g., database 400) of machine learning models (e.g., source separation models 302). For example, the second machine learning model may be a source separation model that corresponds to a noise condition identified by the first machine learning model. In one or more implementations, the output of the first machine learning model include an identifier of one of a plurality of second machine learning models that are stored at the electronic device. In one or more other implementations, the output of the first machine learning model may include an identifier of a noise condition associated with the audio information, and obtaining the second machine learning model includes obtaining a pre-stored machine learning model from a plurality of pre-stored machine learning models at the electronic device based on the identified noise condition. In one or more implementations, the output of the first machine learning model may be the second machine learning model (e.g., a set of parameters for the second machine learning model).

At block 808, the electronic device may provide the second machine learning model to the audio device over the wireless connection. In one or more implementations, the output of the first machine learning model may include a set of parameters for a network architecture stored at the audio device, and providing the second machine learning model to the audio device may include providing the set of parameters to the audio device.

In one or more implementations, the electronic device may detect (e.g., after providing the second machine learning model to the audio device) a change in a noise condition of the electronic device at least in part using a sensor (e.g., using a GPS sensor, a motion sensor, or a microphone) of the electronic device. The electronic device may request additional audio information from the audio device responsive to detecting the change. The electronic device may receive the additional audio information and provide the additional audio information to the first machine learning model, and obtain a third machine learning model based on an additional output of the first machine learning model. The electronic device may then provide the third machine learning model to the audio device from the electronic device over the wireless connection (e.g., to replace the second machine learning model at the audio device for subsequent source separation operations in the new noise condition).

In one or more implementations, the electronic device may receive additional audio information from another audio device. The electronic device may provide the additional audio information to the first machine learning model (e.g., scene analyzer model 304 or a network generation network such as network generation network 500) at the electronic device. The electronic device may obtain a third machine learning model (e.g., one of source separation models 302) based on an additional output of the first machine learning model using the additional audio information. The electronic device may provide the third machine learning model to the additional audio device from the electronic device. In one or more implementations, the audio device and the additional audio device are first and second earbuds of a pair of earbuds, and the electronic device is a companion device that is wirelessly connected to the pair of earbuds over the wireless connection. In one or more implementations, the second machine learning model may correspond to a noise condition identified by the first machine learning model in the audio information (e.g., a noise condition for a first earbud of a pair of earbuds), and the third machine learning model may correspond to a different noise condition identified by the first machine learning model in the additional audio information (e.g., a different noise condition for a second earbud of the pair of earbuds). In one or more implementations, the second machine learning model and the third machine learning model are the same machine learning model and both correspond to a (e.g., single or common) noise condition identified by the first machine learning model in the audio information and the additional audio information (e.g., in a scenario in which the noise conditions around a wearer of a pair of earbuds is homogeneous or similar on both sides of the wearer).

In the example of FIG. 8, the second machine learning model that is provided to the audio device based on the received audio information is obtained based on the output of a first machine learning model, such as a scene analyzer model, at the electronic device. However, it is also appreciated that the machine learning model that is provided to the audio device based on the received audio information may be obtained based directly on the audio information itself in one or more implementations. For example, in an implementation in which the audio device provides a signal-to-noise ratio of an audio input to the audio device, the electronic device may obtain a previously generated source separation model, stored at the electronic device, based on the signal-to-noise ratio, and provide the previously generated source separation model corresponding to that signal-to-noise ratio to the audio device for source separation operations at the audio device. In another example, the electronic device may receive an audio sample or an encoded audio sample from the audio device, determine a signal-to-noise ratio of the audio sample or encoded audio sample, an obtain a source separation model for that signal-to-noise ratio from storage at the electronic device, and provide the obtained source separation model to the audio device for source separation operations at the audio device. For example, in one or more implementations, the signal-to-noise ratio of an audio input to the audio device may be input to the selection network 404 at the electronic device 104.

As described above, one aspect of the present technology is the gathering and use of data available from specific and legitimate sources for training and/or operating machine learning models. The present disclosure contemplates that in some instances, this gathered data may include personal information data that uniquely identifies or can be used to identify a specific person. Such personal information data can include audio data, voice samples, voice profiles, demographic data, location-based data, online identifiers, telephone numbers, email addresses, home addresses, biometric data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for known voices for enhancement via source separation.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the example of identifying voices, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 9:
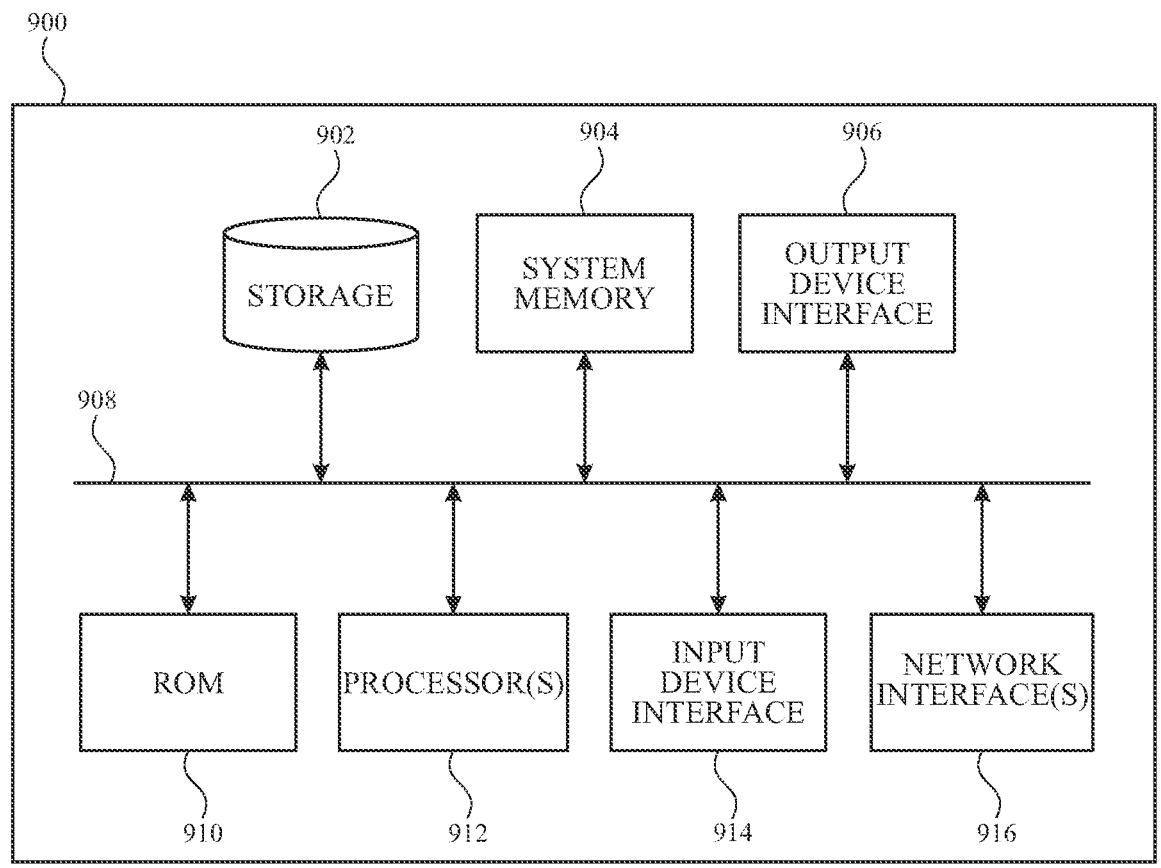
FIG. 9 illustrates an electronic system with which one or more implementations of the subject technology may be implemented.

FIG. 9 illustrates an electronic system 900 with which one or more implementations of the subject technology may be implemented. The electronic system 900 can be, and/or can be a part of, the media output device 150, the electronic device 104, the electronic device 110, the electronic device 115, and/or the server 120 as shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910 (which are each implemented as a non-transitory computer-readable medium). From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes, such as the electronic device 110 shown in FIG. 1, through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

These functions described above can be implemented in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

In accordance with aspects of the disclosure, a method is provided that includes receiving an audio input at a first device; transmitting audio information corresponding to the audio input from the first device to a second device; receiving, responsive to providing the audio information, a source separation model from the second device at the first device; analyzing, at the first device, additional audio input using the received source separation model; and removing, by the first device, at least a portion of the additional audio input based on the analyzing using the source separation model.

In accordance with aspects of the disclosure, a method is provided that includes receiving audio information at an electronic device from an audio device over a wireless connection; providing the audio information to a first machine learning model at the electronic device; obtaining a second machine learning model based on an output of the first machine learning model; and providing the second machine learning model to the audio device from the electronic device over the wireless connection.

In accordance with aspects of the disclosure, an audio device is provided that includes at least one microphone and a processor. The processor is configured to receive audio input using the at least one microphone; transmit audio information corresponding to the audio input to a companion device; receive, responsive to providing the audio information, a source separation model from the companion device; analyze additional audio input received by the microphone using the received source separation model; and remove at least a portion of the additional audio input based on the analysis using of the source separation model.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology.

A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

What is claimed is:

1. A method, comprising:
   receiving audio information at an electronic device from an audio device over a wireless connection;
   receiving, at the electronic device, a user input indicating a perceptual goal of a user of the electronic device; and
   providing a machine learning model to the audio device from the electronic device based on the audio information and the perceptual goal.

2. The method of claim 1, wherein providing the machine learning model to the audio device from the electronic device based on the audio information and the perceptual goal comprises:
   providing the audio information and the perceptual goal to an other machine learning model at the electronic device;
   obtaining the machine learning model based on an output of the other machine learning model; and
   providing the other machine learning model to the audio device from the electronic device over the wireless connection.

3. The method of claim 1, wherein the perceptual goal comprises an identity of a person, and wherein the machine learning model has been trained to enhance a voice of the person.

4. The method of claim 1, wherein the perceptual goal comprises a spatial range of interest, and wherein the machine learning model has been trained to enhance one or more sounds originating from within the spatial range of interest.

5. The method of claim 4, wherein the spatial range of interest comprises at least one of: a distance range or an angular range.

6. The method of claim 4, wherein the one or more sounds comprise speech originating from within the spatial range of interest.

7. The method of claim 1, wherein the perceptual goal comprises a goal to pass through audio content identified in the user input as content of interest.

8. The method of claim 1, wherein the perceptual goal comprises a salient sound indicated in the user input.

9. A method, comprising:
receiving audio information at an electronic device from an audio device over a wireless connection;
providing the audio information to a machine learning model at the electronic device;
generating, with the machine learning model and responsive to the machine learning model receiving the audio information, a set of parameters for a neural network architecture at the audio device; and
providing the set of parameters to the audio device from the electronic device over the wireless connection.

10. The method of claim 9, wherein the set of parameters comprise a set of parameters for a source separation model, the source separation model having been trained to provide source separation for a noise condition in the audio information.

11. The method of claim 10, wherein the set of parameters comprises a set of weights generated for source separation in a noise environment with the noise condition.

12. The method of claim 9, wherein the machine learning model comprises a scene analysis model, and wherein the generating comprises generating the set of parameters on-the-fly while receiving additional audio information from the audio device.

13. The method of claim 12, further comprising, after providing the set of parameters to the audio device:
providing the additional audio information to the machine learning model at the electronic device;
generating, with the machine learning model and responsive to the machine learning model receiving the additional audio information, an updated set of parameters for the neural network architecture at the audio device; and
providing the updated set of parameters to the audio device from the electronic device over the wireless connection.

14. A method, comprising:
receiving audio information at an electronic device from an audio device over a wireless connection;
determining, by the electronic device and based on a current action of a user of the electronic device, a perceptual goal of the user; and
providing a machine learning model to the audio device from the electronic device based on the audio information and the perceptual goal.

15. The method of claim 14, wherein the current action of the user comprises participating in a telephone call or a video conference.

16. The method of claim 14, wherein the current action of the user comprises conversing with a person.

17. The method of claim 14, wherein the current action of the user comprises a viewing action by the user.

18. The method of claim 14, wherein the current action of the user comprises a conversation of the user.

19. The method of claim 14, wherein the current action of the user comprises listening to a crowd of people talking.

20. The method of claim 14, wherein providing the machine learning model to the audio device from the electronic device based on the audio information and the perceptual goal comprises:
providing the audio information and the perceptual goal to an other machine learning model at the electronic device;
obtaining the machine learning model based on an output of the other machine learning model; and
providing the other machine learning model to the audio device from the electronic device over the wireless connection.

* * * * *